United States Patent [19]

Weil et al.

[11] Patent Number: 5,578,666
[45] Date of Patent: Nov. 26, 1996

[54] FLAME RETARDANT COMPOSITION

[75] Inventors: Edward D. Weil, Hastings On Hudson; Weiming Zhu, Elmhurst, both of N.Y.

[73] Assignee: Polytechnic University, Brooklyn, N.Y.

[21] Appl. No.: 282,837

[22] Filed: Jul. 29, 1994

[51] Int. Cl.$^6$ .................. C08K 5/3462; C08K 5/5373; C09K 21/10; C09K 21/12

[52] U.S. Cl. .............. 524/100; 524/123; 524/124; 524/117; 428/378; 428/394; 174/251; 174/110 R; 174/110 SR; 174/121 A; 164/394; 106/18.15; 106/18.18; 252/609

[58] Field of Search .................. 524/100, 102, 524/108, 109, 110, 115, 117, 119, 123, 124, 130; 252/609; 428/373, 378, 394; 174/102 R, 110 R, 251; 164/394; 106/18.15, 18.18

[56] References Cited

U.S. PATENT DOCUMENTS

| | | |
|---|---|---|
| 3,278,446 | 10/1966 | Irani . |
| 3,364,189 | 1/1968 | Allcock et al. . |
| 3,394,083 | 7/1968 | Shen . |
| 4,041,230 | 8/1977 | Huber et al. . |
| 4,080,501 | 3/1978 | Leman et al. . |
| 4,333,869 | 6/1982 | Marciandi et al. . |
| 4,414,345 | 11/1983 | Rasberger . |
| 4,600,734 | 7/1986 | von Bonin et al. ............ 523/179 |
| 4,885,326 | 12/1989 | Haruna et al. . |
| 5,036,121 | 7/1991 | Coaker et al. ............ 524/100 |
| 5,198,483 | 3/1993 | Gainer . |
| 5,244,958 | 9/1993 | Goodman ............ 524/447 |
| 5,276,066 | 1/1994 | Paulik . |

OTHER PUBLICATIONS

L. Maier, "Organic Phosphorus Compunds 61 Esterification and Chlorination of Nitrilo–tri(methylene–phosphonic acid), $N(CH_2PO_3H_2)_3$, and Hydroxyethylidenediphosphonic Acid, $H_2O_3PC(OH)(CH_3)PO_3H_2$, and the Corresponding Esters[1]", *Helvetica Chimica Acta*, vol. 56, Fasc. 4, pp. 1257–1266, (1973).

A. A. Oswald, "Synthesis of Cyclic Phosphorous Acid Esters by Transesterification", *Can. J. of Chem.*, vol. 37, pp. 1498–1504, (1959).

*Primary Examiner*—Sharon Gibson
*Assistant Examiner*—Joseph D. Anthony
*Attorney, Agent, or Firm*—Fish & Richardson P.C.

[57] ABSTRACT

A flame retardant composition comprising an effective synergistic flame retardant combination of a melamine phosphate and tris(neopentyl) nitrilotris(methylphosphonate) suitable for use as an additive to a normally flammable polymer composition, especially wire insulation and cable jackets.

27 Claims, No Drawings

FLAME RETARDANT COMPOSITION

FIELD OF THE INVENTION

This invention relates to flame retardant compositions and, in particular, nitrilotris(methylphosphonic) ester—melamine phosphate compositions useful as flame retardant additives, for example, in wire and cable insulation.

BACKGROUND OF THE INVENTION

Wire and cable insulation (which term includes primary insulation and jacketing), unless made from costly inherently flame retardant materials, is quite flammable and thus poses a hazard of fire propagation in power plants, in distribution areas, manholes, and buildings. Ignition can easily occur from overheating or arcing.

The present art of flame-retarding wire and cable insulation is accomplished in three principal ways. One approach is to utilize halogenated materials, for example chlorinated polymers such as chlorosulfonated polyethylene, neoprene, polyvinyl chloride, or the like, or halogen-containing additives such as decabromodiphenyl oxide, Dechlorane Plus®, tetrabromophthalimides, chlorowaxes, or the like. Frequently such halogenated polymers or additives are boosted or "synergized" in their flame retardant activity by the further addition of antimony oxide. All of these approaches involving halogens have faced the inherent shortcoming that the evolved gases (i.e. hydrogen chloride or hydrogen bromide) in the event of fire or even merely overheating are corrosive gases, and also highly irritating to the eyes and respiratory system. A further shortcoming, more recently a basis of concern regarding halogenated flame retardants, is that they may pose an environmental hazard, being in general persistent and moreover being capable of combustion or pyrolysis under some conditions to form toxic compounds such as polyhalodibenzodioxins or polyhalodibenzofurans. Whether or not actually a hazard, at least these substances are a cause of concern and regulatory attention.

A second approach to flame retardancy of wire and cable insulation is to utilize a hydrated mineral such as alumina trihydrate or magnesium hydroxide. At rather high loadings, such minerals provide an endothermic water release under heating and burning conditions which effects a flame retardant action. The defect with these systems is the high loadings required, which render the insulation undesirably stiff and poor on abrasion. Moreover, the use of metal hydroxides as flame retardants lowers the electrical properties of the insulation.

Processing difficulties in manufacturing such highly loaded polymer systems are also experienced. Some improvement can be achieved with coupling agents such as silanes and silicones, but at substantial cost.

A third approach is to utilize phosphorus compounds plus char-forming and often intumescent additives. Typical formulations use ammonium polyphosphate as the char-forming catalysts and a resin such as dipentaerythritol, ethyleneurea-formaldehyde resin, or triazine-piperazine resin as the source of the char. Such systems have cost problems and severe electrical shortcomings. The ammonium polyphosphate component is hydrolyzable and forms electrically conductive water-soluble ammonium phosphate; moreover, most of the known char-forming resins are excessively hydrophilic and thus water-sensitive if not outright soluble.

Accordingly, there is a need for flame retardant systems for normally flammable insulation or cable jacket which does not cause corrosive or toxic emissions, which does not unduly stiffen or otherwise adversely effect the physical properties of the insulation or jacket, which permits retention of good electrical properties suitable for insulation or for jacket, and which is resistant to water, including hot water.

SUMMARY OF THE INVENTION

The invention comprises a novel flame retardant composition comprising an effective synergistic amount of the tris(neopentylene) ester of nitrilotris(methylphosphonic) acid and a melamine phosphate. The composition may be blended with a normally flammable thermoplastic or elastomeric crosslinked polymer to confer flame retardancy. The invention also provides a process for the preparation of a flame retardant material incorporating the flame retardant composition and functional articles, such as cable are wire insulation, formed therefrom.

DETAILED DESCRIPTION OF THE INVENTION

The invention comprises a novel flame retardant composition comprising an effective synergistic combination of the tris(neopentylene) ester of nitrilotris(methylphosphonic) acid and a melamine phosphate. Synergism is the action of two or more substances to achieve an effect of which each is individually incapable. The term "effective synergistic combination", as used in this specification, means that amount of combined substances that is effective as a flame retardant where the same amount of either substance alone, would be ineffective.

The invention also comprises flame retardant blends of the novel flame retardant composition with normally flammable polymers to form flame retardant materials. By "normally flammable polymer" it is meant that, in the absence of a flame retardant additive, the polymer is ignitable, for example from overheating or arcing.

The invention further comprises a method of preparing novel flame retardant materials.

The invention also comprises functional articles, such as cable and wire insulation, formed from novel flame retardant materials.

The normally flammable polymers used in the flame retardant insulation of the invention are the unhalogenated polymers of thermoplastic or crosslinked elastomeric character, such as polyethylene, polypropylene, ethylene-higher olefin copolymers, ethylene-vinyl acetate copolymers (EVA), ethylene vinylsilane copolymers and moisture-cured products thereof, ethylene-propylene copolymers or terpolymers and crosslinked products thereof, polybutadienes, polyisoprenes, styrene-butadiene copolymers, and polyisobutylenes. In a broader aspect of the invention, the synergistic combination of additives can be beneficially used in any normally flammable polymer including polyamides, polyesters, polyethers, polysulfides, and polyurethanes, as well as natural and semisynthetic bituminous materials such as asphalt.

The melamine phosphate component of the invention comprises at least one salt of melamine with a phosphorus acid. In its broadest scope, the melamine salts of phosphorus acids include monomelamine (ortho)phosphate, dimelamine (ortho)phosphate, dimelamine pyrophosphate, melamine metaphosphate, melamine alkyl phosphate, melamine benzenephosphonate and melamine phosphite. However, a preferred melamine salt because of its water insolubility is melamine pyrophosphate.

The tris(neopentylene) ester of nitrilotris(methylphosphonic) acid used in the invention is also nameable as tris(neopentyl) nitrilotris(methylphosphonate) and is substantially a single compound of the structure:

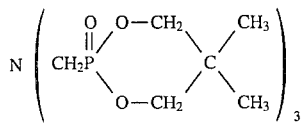

This compound, obtained as Monsanto XPM-1000®, is producible by the method described for the preparation of the corresponding hexaethyl ester by Irani (to Monsanto), U.S. Pat. No. 3,278,446 (1966), by Shen (to Monsanto), U.S. Pat. No. 3,394,083 (1968), and by Maier, Helv. Chim. Acta 56(4), 1257–1266 (1973) substituting for the diethyl phosphite used in these references the cyclic neopentyl phosphite (phosphonate) described by Oswald in Canadian Journal of Chemistry 37, 1498–1504 (1959). The compound and its preparation are described in U.S. Pat. No. 5,276,066 to Paulik, et al., assigned to Monsanto (1994). The commercial product is a white crystalline powder having 18% P, 2.5% N, a melting point of 243°–245° C., water insoluble, neutral and stable to about 300° C.

The use of melamine phosphate-containing compositions and tris(neopentyl) nitrilotris(methylphosphonate) as flame-retardant additives is known in the art. It has been discovered, however, that compositions comprising combinations of these two compounds unexpectedly confer improved flame retardant properties.

The weight ratio of melamine phosphate to tris(neopentyl) nitrilotris(methylphosphonate) in the fire retardant composition of the invention is preferably in the range of about 4:1 to a 1:10. Most preferably, the weight ratio of melamine phosphate to tris(neopentyl) nitrilotris(methylphosphonate) in the composition is about 1:2.

In the flame retardant polymer material of the invention, the quantities of these additives used are about 5 (preferably 10) to about 100 phr (parts per hundred of base polymer, such as EVA) of the melamine phosphate, and about 5 (preferably 20) to about 100 phr of the tris (neopentylene) ester of nitrilotris(methylphosphonic) acid, preferably with the lower limit of each additive about 10 phr. An optimum is generally found empirically, within the limits given, by optimization as known to those skilled in the compounding art. Preferably, the combination of melamine phosphate and tris(neopentyl) nitrilotris(methylphosphonate) comprises greater than about 20% of the total weight of the flame retardant material. Most preferably, the combination comprises greater than about 30% of the total weight of the material.

The amount is also governed by the flame retardancy standard to be met. The higher quantity (preferred minima as stated) is typically used when the Underwriter's Laboratory (UL) 94 V-0 standard, or its equivalent amongst wire and cable standards, is to be met, but the lower amounts typically suffice to meet lower standards such as slow burning in a horizontal position as exemplified by a UL 94 HB SE standard.

Where the flame retardant material of the invention is to be used for cable jacketing, powdered silicaceous minerals, in general, may also be used as additives. Preferred silica-based minerals are silica, kaolinite, talc, mica, aluminosilicate minerals, including various clays (montmorillonites, bentonites, attapulgites and others). However, where the material is to be used as a primary insulation for power cable, substantially amorphous and anhydrous silica-based minerals are preferable. These are primarily calcined kaolinite and fused silica.

The blending can be done by any of several polymer mixing methods known to the art, such as kneading, processing in an extruder or in a two-roll mill until the formulation is substantially uniform. The thermoplastic mixture is then preferably cured, by methods known in the art, to give it the desirable elastomeric and heat resistant properties required for wire and cable insulation. This curing is done either by incorporation of a suitable peroxide such as dicumyl peroxide followed by heating, or by radiation, or by inclusion of a small amount of a trialkoxysilane either in the original copolymer as a comonomer or by grafting it on using a peroxide initiator in the known manner to cause a vinyltrialkoxysilane to graft to the thermoplastic. In the cases where the trialkoxysilane is thus introduced, the curing is accomplished by exposing the formulation to moisture, such as by exposing to steam.

Other ingredients may be included in the formulation of the invention. These may be pigments, such as carbon black, titanium dioxide, zinc oxide or red lead. In addition, plasticizers, extender oils, stabilizers, such as hindered phenol antioxidants, arylamine antioxidants and antiozonants, and stabilizer synergists, such as sulfides, phosphites and phosphonites and the like may be used. Components often used in wire and cable insulation to aid moisture resistance and improve electricals, such as red lead, stearates, paraffin waxes and the like can be used, as is customary in the art of insulation compounding. Processing aids, such as soaps, fluorocarbons and silicones can be added.

In addition, the physical properties and processing of the formulation of the invention can be improved by incorporation of compatibilizers, such as maleic anhydride adducts of polyolefins, including the maleic anhydride adduct of ethylene-propylenediene modified terpolymers (EPDM). Other compatibilizers include block copolymers of styrene and ethylene, propylene or butylene (available from Shell under the trademark KRATON®, for example), and ethylene-vinyl acetate copolymer(EVA). These compatibilizers may be used from additive quantities of about 2% up to 100% of the base polymer.

The materials of the invention are flame retardant to various useful degrees as assessed by the criteria and standards of the wire and cable insulation field. Such criteria range from small scale tests such as the oxygen index test and the Underwriters Laboratory VW-1 test to large scale cable tray tests such as the IEEE 383, or more recently, the rate-of-heat-release calorimetry tests such as the one utilizing the "cone calorimeter" developed at NIST. Insulation materials having oxygen indexes above about 27 and preferably above about 30, and/or a V-0 rating by the UL-94 test method, generally have a good chance of passing the larger scale tests, which are however influenced by the construction, weight of the conductor, closeness of packing, and other geometric factors aside from the character of the insulation material itself. It will be recognized by those skilled in the art of insulation compounding that there are many such standards and test methods, and that the amount of the additives used to flame retard a given wire or cable insulation will depend on many factors, such as severity of the test to be applied, construction, choice of base polymer, weight of the conductor, aging and weathering criteria, and the like.

To illustrate and make clear the invention, and to present the best mode of practicing the invention, she following examples are given, and are not intended to limit the scope of the invention. The standards and test methods used are the Limiting Oxygen Index (LOI) and Underwriters Laboratory (UL) 94 test, a test involving bottom ignition of a vertically held sample. These are believed to be acceptable and meaningful criteria of flame retardancy.

EXAMPLE 1

The following formulation was thus prepared:

| | |
|---|---|
| Ethylene-vinyl acetate copolymer (ELVAX ® 460, a DuPont product | 100 parts |
| Melamine pyrophosphate (Aeroguard ® MPP, American Cyanamid) | 30 parts |
| XPM-1000 ® (tris(neopentylene) ester of nitrilotris(methylphosphonic) acid, obtained from Monsanto) | 60 parts |

Where "parts" is used, parts by weight is intended. Where "parts per hundred" is used, parts by weight per hundred parts of the polymer is intended.

This formulation had an LOI of 28.9 and a UL94 V-0 rating at both ⅛" and ¹/₁₆".

This and subsequent formulations were mixed in a Brabender Plasticorder at about 120°–130° C. for about 5 minutes: The resulting mixture was pressed in a Carver press at about 120° C. for about 5 minutes. The sheet was cut into test bars and the flame retardancy was determined by the limiting oxygen index (LOI) method and by the Underwriters Laboratory 94 vertical test (UL94 test) at ⅛" thickness or +e,fra 16+ee " thickness or both.

EXAMPLES 2–6

In a manner similar to Example 1 above, a number of formulations were prepared with different loading levels of both MPP and XPM-1000®. The results in Table I indicated that the loading of 32.4 wt. % (MPP/XPM-1000=1:2) was needed in order to attain a UL94 rating of V-0 at ⅛" and a loading of 37.5% to attain V-0 at ¹/₁₆".

TABLE I

| Example No. | MPP (parts) | XPM-1000 (parts) | Total loading (%) | LOI | UL94 at ⅛" | UL94 at ¹/₁₆" |
|---|---|---|---|---|---|---|
| 2 | 0 | 0 | 0 | 18.4 | burned | burned |
| 3 | 15 | 30 | 31.0 | 25.5 | V-2 | V-2 |
| 4 | 16 | 32 | 32.4 | 25.9 | V-0 | V-2 |
| 5 | 20 | 40 | 37.5 | 27.5 | V-0 | V-0 |
| 6 | 30 | 60 | 47.4 | 28.9 | V-0 | V-0 |

The above data show compositions within the preferred range of the invention.

EXAMPLES 7–16

In the manner similar to Example 1 above, a series of formulations was prepared varying the ratio of MPP to XPM-1000®. The most favorable ratio was found to be about 1:2 (TABLE II).

TABLE II

| Example No. | MPP (parts) | XPM-1000 (parts) | LOI | UL94 at ⅛" | UL94 at ¹/₁₆" |
|---|---|---|---|---|---|
| 7 | 118 | 0 | 25.7 | burned | burned |
| 8 | 60 | 30 | 27.7 | V-2 | V-2 |
| 9 | 45 | 45 | 26.1 | V-0 | V-2 |
| 10 | 30 | 60 | 28.9 | V-0 | V-0 |
| 11 | 0 | 90 | 23.4 | burned | burned |
| 12 | 10 | 50 | 25.8 | V-2 | V-2 |
| 13 | 15 | 45 | 26.5 | V-0 | V-2 |
| 14 | 20 | 40 | 27.5 | V-0 | V-0 |
| 15 | 23.3 | 36.7 | 26.3 | V-0 | V-2 |
| 16 | 16.7 | 33.3 | 25.0 | burned | burned |

The above data show the synergistic feature of the invention. High rates of either flame retardant additive alone failed to give a satisfactory UL94 rating.

EXAMPLES 17–22

In a manner similar to Example 1 above, a series of formulations was prepared in which melamine (ortho)phosphate (MP, Albright & Wilson AMGARD® NH) was substituted for melamine pyrophosphate (TABLE III).

TABLE III

| Example No. | MP (parts) | XPM-1000 (parts) | LOI | UL94 at ⅛" | UL94 at ¹/₁₆" |
|---|---|---|---|---|---|
| 17 | 15 | 45 | 26.0 | V-0 | V-2 |
| 18 | 20 | 40 | 26.0 | V-0 | V-2 |
| 19 | 23.3 | 36.7 | 27.5 | V-0 | V-2 |
| 20 | 26.7 | 33.3 | 25.7 | V-2 | burned |
| 21 | 30 | 30 | 25.8 | burned | burned |
| 22 | 40 | 20 | 26.3 | V-2 | V-2 |

The above data show that melamine (ortho)phosphate can be substituted for melamine pyrophosphate, although with less consistent results.

EXAMPLES 23–25

In a manner similar to example 1, a series of formulations was prepared with different phosphates in place of MPP or MP (TABLE IV).

TABLE IV

| Example No. | Phosphate (parts) | XPM-1000 (parts) | LOI | UL94 at ⅛" |
|---|---|---|---|---|
| 23 | DMP, 20 | 40 | 26.0 | V-0 |
| 24 | BPEPAC, 20 | 40 | 25.3 | V-2 |
| 25 | MAP, 20 | 40 | 24.2 | V-2 |

Key to abbreviations:
DMP=dimelamine phosphate (Albright & Wilson AMGARD® ND)
BPEPAC=bispentaerythritol (bicyclic) phosphate carbonate (Akzo Chemical Co.)
MAP=melamine amyl phosphate (COBRAGUARD®, Synthetic Products Co.)

EXAMPLES 26–34

In a manner similar to example 1 above, a series of formulations was prepared in which additional additives were added (TABLE V).

TABLE V

| Example | MPP (parts) | XPM-1000 (parts) | Additive (parts) | LOI | UL94 at 1/8" | UL94 at 1/16" |
|---|---|---|---|---|---|---|
| 26 | 20 | 40 | Mn st., 3 | 26.9 | V-0 | V-0 |
| 27 | 20 | 40 | Zn AcAc, 3 | 26.9 | V-0 | V-0 |
| 28 | 20 | 40 | NiO, 3 | 27.5 | V-0 | V-0 |
| 29 | 20 | 40 | TiO$_2$, 3 | 26.1 | V-0 | V-2 |
| 30 | 16 | 32 | kaolin, 10 | 25.2 | V-2 | — |
| 31 | 60 | 30 | PPO, 10 | 25.8 | V-0 | V-2 |
| 32 | 60 | 10 | DIPE, 20 | 26.9 | V-2 | — |
| 33 | 60 | 10 | mel, 20 | 24.9 | V-2 | — |

Key to abbreviations or further information on additives: Mn st.=manganous stearate (Pfaltz and Bauer); Zn AcAc=zinc acetylacetonate (Pfaltz and Bauer); NiO=reagent grade powder (Aldrich); TiO$_2$=TITANOXIDE® P25 (Degussa Corp.); PPO=poly (2,6dimethylphenylene oxide) (GE BLENDEX® HPP821); Kaolin.=TRANSLINK® 37 (Engelhard silanated calcined kaolinite); DIPE=dipentaerythritol (AQUALON® DIPE); mel.=superfine melamine from Melamine Chemicals Inc.

EXAMPLE 34

In a similar manner to example 1 above, a formulation was prepared in which low density polyethylene (Quantum PETROTHENE® NA951) was substituted for ethylene-vinyl acetate copolymer. The resultant formulation had an LOI of 26.9 and a UL94 rating of V-0 at 1/8".

EXAMPLE 35

In a similar manner to example 1 above, a formulation was prepared in which polypropylene (Himont PROFAX® 6523, MF4) was substituted for ethylene-vinyl acetate copolymer. This formulation was processed and molded at 200° C. instead of at 120° C. as in the case of ethylene-vinyl acetate copolymer. The resultant formulation had a LOI of 28.4 and a UL94 rating of V-0 at 1/8".

What is claimed is:

1. A flame retardant material comprising a normally flammable polymer blended with an effective amount of a flame retardant additive comprising a synergistic flame retardant combination of a melamine phosphate and tris(neopentyl) nitrilotris(methylphosphonate) at a ratio of about 2:1 to 1:5; wherein said effective amount is sufficient in itself to achieve a test standard rating of said material of at least V-O according to the UL-94 test rating, or to achieve an equivalent flame retardancy test rating to another test method.

2. The material of claim 1, wherein said melamine phosphate comprises melamine orthophosphate.

3. The material of claim 1, wherein said melamine phosphate comprises melamine pyrophosphate.

4. The material of claim 1 wherein said combination is a 1:2 ratio of melamine phosphate to tris(neopentyl) nitrilotris(methylphosphonate).

5. The material of claim 1, wherein said normally flammable polymer is selected from a group consisting of polyolefin and an olefin copolymer with a vinyl monomer.

6. The material of claim 5, wherein said normally flammable polymer comprises ethylene-vinyl acetate copolymer.

7. The material of claim 5, wherein said normally flammable polymer comprises polyethylene.

8. The material of claim 5, wherein said normally flammable polymer comprises polypropylene.

9. The material of claim 1, wherein said combination comprises from about 5 to about 100 parts by weight of a melamine phosphate, and from about 5 to about 100 parts by weight of tris(neopentyl) nitrilotris(methylphosphonate) wherein parts are based on 100 parts by weight of the normally flammable polymer.

10. The material of claim 9, wherein said combination comprises from about 10 to about 100 parts by weight of a melamine phosphate, and from about 20 to about 100 parts by weight of tris(neopentyl) nitrilotris(methylphosphonate) wherein parts are based on 100 parts by weight of the normally flammable polymer.

11. The material of claim 1, wherein said combination comprises greater than about 20% of the total weight of said material.

12. The material of claim 11 wherein said combination comprises greater than about 30% of the total weight of said material.

13. A method of making a flame retardant material comprising the steps of:

preparing a formulation comprising 100 parts of a normally flammable polymer, 5–100 parts of a melamine phosphate and 5–100 parts of tris(neopentyl) nitrilotris(methylphosphonate); wherein said melamine phosphate and tris(neopentyl) nitrilotris (methphpsphonate) combination is sufficient in itself to achieve a test standard rating of said material of at least V-O according to the UL-94 test rating or to achieve an equivalent flame retardancy test rating according another test method;

mixing said formulation until said formulation is substantially uniform;

processing the resulting mixture into the desired form; and optionally curing the mixture.

14. A flame retardant wire and cable jacket comprising a normally flammable polymer blended with an effective amount of a flame retardant additive comprising a synergistic combination of a melamine phosphate and a tris(neopentyl) nitrilotris(methylphosphonate) at a ratio of about 2:1 to 1:5; wherein said effective amount is sufficient in itself to achieve a test standard rating of said jacket of at least V-O according to the UL-94 test rating or to achieve an equivalent flame retardancy test rating according to another test method.

15. The flame retardant wire and cable jacket of claim 14, wherein said melamine phosphate comprises melamine orthophosphate.

16. The flame retardant wire and cable jacket of claim 14, wherein said melamine phosphate comprises melamine pyrophosphate.

17. The flame retardant wire and cable jacket of claim 20, wherein said combination is a 1:2 ratio of melamine phosphate to tris(neopentyl) nitrilotris(methylphosphonate).

18. The flame retardant wire and cable jacket of claim 14, wherein said normally flammable polymer is selected from a group consisting of polyolefin and an olefin copolymer with a vinyl monomer.

19. The flame retardant wire and cable jacket of claim 18, wherein said normally flammable polymer comprises ethylene-vinyl acetate copolymer.

20. The flame retardant wire and cable jacket of claim 18, wherein said normally flammable polymer comprises polyethylene.

21. The flame retardant wire and cable jacket of claim 18, wherein said normally flammable polymer comprises polypropylene.

22. The flame retardant wire and cable jacket of claim 14, wherein said combination comprises from about 5 to about 100 parts by weight of a melamine phosphate, and from about 5 to about 100 parts by weight of tris(neopentyl) nitrilotris(methylphosphonate) wherein parts are based on 100 parts by weight of the normally flammable polymer.

23. The flame retardant wire and cable jacket of claim 22, wherein said combination comprises from about 10 to about 100 parts by weight of a melamine phosphate, and from about 20 to about 100 parts by weight of tris(neopentyl) nitrilotris(methylphosphonate) wherein parts are based on 100 parts by weight of the normally flammable polymer.

24. The flame retardant wire and cable jacket of claim 14, further comprising a silicaceous mineral.

25. The flame retardant wire and cable jacket of claim 24, wherein said silicaceous mineral is anhydrous and amorphous.

26. The flame retardant wire and cable jacket of claim 25, wherein said silicaceous mineral is calcined kaolinite.

27. The flame retardant wire and cable jacket of claim 25, wherein said silicaceous mineral is fused silica.

* * * * *

UNITED STATES PATENT AND TRADEMARK OFFICE
CERTIFICATE OF CORRECTION

PATENT NO. : 5,578,666
DATED : November 26, 1996
INVENTOR(S) : Weil et al.

It is certified that error appears in the above-identified patent and that said Letters Patent is hereby corrected as shown below:

In column 5, line 31, change "+e.fra 16+ee" to read --1/16"--.

Signed and Sealed this

Seventeenth Day of February, 1998

Attest:

BRUCE LEHMAN

Attesting Officer

Commissioner of Patents and Trademarks